United States Patent
van Beek et al.

(10) Patent No.: US 12,338,344 B2
(45) Date of Patent: Jun. 24, 2025

(54) POLYMER COMPOSITION WITH A HIGH HEAT DEFLECTION TEMPERATURE

(71) Applicant: SABIC GLOBAL TECHNOLOGIES B.V., Bergen op Zoom (NL)

(72) Inventors: Dimphna Johanna Maria van Beek, Sittard (NL); Christelle Marie Hélène Grein, Aachen (DE); Rob Donners, Brunssum (NL); Gerard Jan Eduard Biemond, Brunssum (NL); Zahra Fahimi, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 462 days.

(21) Appl. No.: 17/785,770

(22) PCT Filed: Dec. 18, 2020

(86) PCT No.: PCT/EP2020/087082
§ 371 (c)(1),
(2) Date: Jun. 15, 2022

(87) PCT Pub. No.: WO2021/130122
PCT Pub. Date: Jul. 1, 2021

(65) Prior Publication Data
US 2023/0059380 A1    Feb. 23, 2023

(30) Foreign Application Priority Data
Dec. 24, 2019  (EP) ................. 19219578

(51) Int. Cl.
C08L 23/14    (2006.01)
C08L 23/12    (2006.01)

(52) U.S. Cl.
CPC ......... C08L 23/12 (2013.01); *C08L 2205/025* (2013.01); *C08L 2205/03* (2013.01); *C08L 2207/02* (2013.01)

(58) Field of Classification Search
None
See application file for complete search history.

(56) References Cited

U.S. PATENT DOCUMENTS 3,256,367 A    6/1966  Jayne, Jr. et al.
5,017,714 A    5/1991  Welborn, Jr.
(Continued)

FOREIGN PATENT DOCUMENTS

CN    102532774 A    7/2012
CN    102108175 B    3/2014
(Continued)

OTHER PUBLICATIONS

International Search Report for International Application No. PCT/EP2020/087082, International Filing Date Dec. 18, 2020, Date of Mailing Mar. 24, 2021, 5 pages.
(Continued)

*Primary Examiner* — Richard A. Huhn
(74) *Attorney, Agent, or Firm* — CANTOR COLBURN LLP

(57) ABSTRACT

The present invention relates to a polymer composition with a high heat deflection temperature comprising a first heterophasic propylene copolymer, a second heterophasic propylene copolymer and optionally an inorganic filler. The present invention further relates to a process for the preparation of said polymer composition. The present invention further relates to an automotive part comprising such polymer composition.

15 Claims, 2 Drawing Sheets

(56) References Cited

U.S. PATENT DOCUMENTS

| | | | |
|---|---|---|---|
| 5,093,415 | A | 3/1992 | Brady, III et al. |
| 5,324,820 | A | 6/1994 | Baxter |
| 7,714,057 | B2 | 5/2010 | Heck et al. |
| 2002/0013416 | A1 | 1/2002 | Noel, III |
| 2012/0108728 | A1* | 5/2012 | Tranninger ............. C08L 23/16 524/451 |
| 2014/0187708 | A1 | 7/2014 | Grein et al. |
| 2018/0002515 | A1 | 1/2018 | Grein et al. |
| 2023/0014149 | A1 | 1/2023 | Van Beek |
| 2023/0038583 | A1 | 2/2023 | Van Beek et al. |

FOREIGN PATENT DOCUMENTS

| | | |
|---|---|---|
| CN | 102807703 B | 4/2015 |
| EP | 2410007 | 1/2012 |
| EP | 2650329 A1 | 10/2013 |
| GB | 2568909 A1 | 6/2019 |
| IN | 102627806 A1 | 8/2012 |
| WO | 9831744 A | 7/1998 |
| WO | 2006010414 A1 | 2/2006 |
| WO | 2010142540 A1 | 12/2010 |
| WO | 2015024891 A1 | 2/2015 |
| WO | 2015091151 A1 | 6/2015 |
| WO | 2015161398 A1 | 10/2015 |
| WO | 2016198344 A1 | 12/2016 |
| WO | 2017060139 A1 | 4/2017 |
| WO | 2018099882 A1 | 6/2018 |
| WO | 2018108927 A1 | 6/2018 |

OTHER PUBLICATIONS

PE 100 Pipe Systems, second edition, Heiner Bromstrup (editor), 2004, pp. 16-20 ISBN 3-8027-2728-2.

Ser Van Der Ven; "Polypropylene and other Polyolefins"; Elsevier 1990, pp. 8-10.

Written Opinion for International Application No. PCT/EP2020/087082, International Filing Date Dec. 18, 2020, Date of Mailing Mar. 24, 2021, 7 pages.

* cited by examiner

POLYMER COMPOSITION WITH A HIGH HEAT DEFLECTION TEMPERATURE

CROSS REFERENCE TO RELATED APPLICATIONS

This application is a National Stage application of PCT/EP2020/087082, filed Dec. 18, 2020, which claims the benefit of European Application No. 19219578.2, filed Dec. 24, 2019, both of which are incorporated by reference in their entirety herein.

FIELD

The present invention relates to a polymer composition with a high heat deflection temperature. The present invention further relates to a process for the preparation of said polymer composition. The present invention further relates to an automotive part comprising such polymer composition.

BACKGROUND

Polymer compositions, especially polymer compositions based on polypropylene are widely used in automotive industry thanks to their excellent mechanical and chemical properties. Polymer compositions based on polypropylene with a high heat deflection temperature are preferred for Automotive applications because such compositions are not to prone to deform in a high temperature environment or by the heat generated by the automotive engine operation.

U.S. Pat. No. 7,714,057B2 discloses a filled thermoplastic polyolefin composition comprising a highly crystalline isotactic propylene homopolymer, an ethylene/α-olefin elastomeric impact modifier, and a reinforcing grade of a platy filler, for example, talc. Such filled TPO compositions have low gloss, good low temperature impact resistance, and superior flex modulus and heat deflection temperature (HDT) properties.

US20020013416A1 discloses a mineral filled thermoplastic olefin composition and a method for producing such composition, which comprises a polymer mixture, a mineral, and a heat deflection temperature modifying agent. The heat deflection temperature modifying agent significantly increases the heat deflection temperature of the composition.

EP3237535A1 discloses a polypropylene composition comprising: 40-90% by total weight of the composition of a polymer blend comprising polypropylene having a melt flow index as measured according to ISO 1133 at 230° C. and 2.16 kg of 2.0-100 g/10 min; 5-25% by total weight of the composition of one or more plastomers; 0.5-25% by total weight of the composition of mineral filler selected from the group consisting of phyllosilicates, mica or wollastonite; and 0.2-4% by total weight of the composition of glass fibres having an average fibre diameter in the range of 5-30 μm. The polypropylene composition of the EP3237535A1 combines excellent shrinkage properties with a desirable heat deflection temperature, without a significant adverse effect on mechanical properties.

SUMMARY

It is the object of the present invention to provide a polymer composition with a high heat deflection temperature.

This object is achieved by a polymer composition comprising a first heterophasic propylene copolymer (a), a second heterophasic propylene copolymer (b) and optionally an inorganic filler, wherein the amount of the first heterophasic propylene copolymer (a) is in the range from 5.3 to 63.7 wt % based on the total amount of the polymer composition, wherein the amount of the second heterophasic propylene copolymer (b) is in the range from 4.7 to 64.5 wt % based on the total amount of the polymer composition, wherein the xylene soluble part of first heterophasic propylene copolymer (a) is in the range from 10 to 27 wt % as determined by ISO16152:2005 based on the total amount of the first heterophasic propylene copolymer (a), wherein the ratio between the intrinsic viscosity of the xylene soluble part of first heterophasic propylene copolymer (a) and of the xylene insoluble part of first heterophasic propylene copolymer (a) is in the range from 3.1 to 7.2, wherein the intrinsic viscosity of the xylene soluble part and of the xylene-insoluble part are measured according to ISO1628-1:2009 and ISO1628-3:2010 respectively in decalin at 135° C.; wherein the MFI of the first heterophasic propylene copolymer (a) is in the range from 40 to 120 dg/min as determined according to ISO1133-1:2011 at 230° C. with a 2.16 kg load;

wherein the xylene soluble part of the second heterophasic propylene copolymer (b) is in the range from 12 to 27 wt % as determined by ISO16152:2005 based on the total amount of the second heterophasic propylene copolymer (b), where in the intrinsic viscosity of the xylene soluble part of the second heterophasic propylene copolymer (b) is in the range from 2.9 to 4.6 dl/g as measure according to ISO1628-1:2009 in decalin at 135° C.; wherein the MFI of the second heterophasic propylene copolymer (b) is in the range from 5.6 to 65 dg/min as determined according to ISO1133-1:2011 at 230° C. with 2.16 kg load, wherein the MFI of the polymer composition is in the range from 5 to 100 dg/min as determined according to ISO1133-1:2011 at 230° C. with 2.16 kg load.

DETAILED DESCRIPTION

Figure 1:
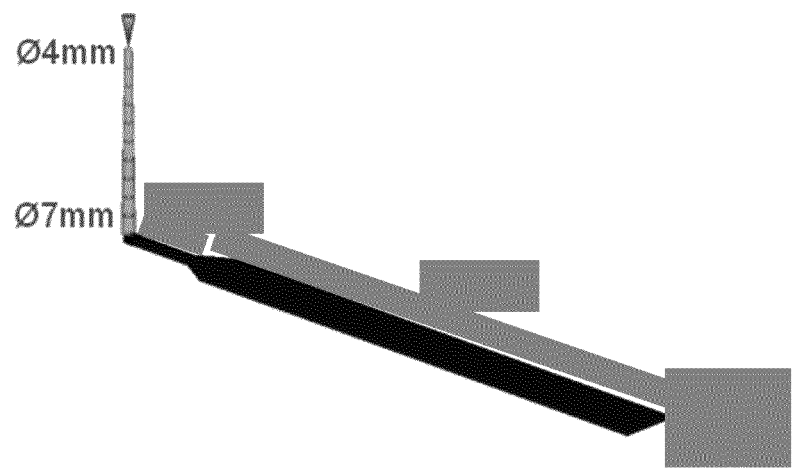
FIG. 1 illustrates the feeding system and the mold for making two types of ruler-shaped test specimens from the pellets of the examples.

It was surprisingly found that the polymer composition according to the present invention has a high heat deflection temperature.

In a preferred embodiment, the polymer composition according to the present invention has a high heat deflection temperature and good tiger stripe performance.

Heterophasic Propylene Copolymer

A heterophasic propylene copolymer typically has a two-phase structure, comprises a propylene-based semi-crystalline polymer as matrix and a dispersed elastomer phase, usually an ethylene-α-olefin rubber. Heterophasic propylene copolymers are usually prepared in one polymerization process.

The First Heterophasic Propylene Copolymer (a)

The first heterophasic propylene copolymer (a) preferably comprises a first propylene polymer (a1) as matrix and a first ethylene-α-olefin copolymer (a2) as dispersed phase.

The amount of the first propylene polymer (a1) is preferably in the range from 80 to 92 wt %, preferably in the range from 85 to 90 wt % based on the total amount of the first heterophasic propylene copolymer (a).

The first propylene polymer (a1) in the first heterophasic propylene copolymer (a) can be a propylene homopolymer or/and a propylene-α-olefin copolymer wherein the α-olefin has 2 or 4 to 20 carbon atoms, for example the propylene-α-olefin can be a propylene-ethylene copolymer or a propylene-butene copolymer. Preferably the first propylene polymer (a1) in the first heterophasic propylene copolymer (a) is a propylene homopolymer.

The melt flow index (MFI) of the first propylene polymer (a1) in the first heterophasic propylene copolymer (a) is preferably in the range from 150 to 300 dg/min, preferably from 180 to 270 dg/min, more preferably from 200 to 250 dg/min as determined according to ISO1133-1:2011 at 230° C. with 2.16 kg load.

The amount of the first ethylene-α-olefin copolymer (a2) is preferably in the range from 8 to 20 wt %, preferably from 10 to 15 wt % based on the total amount of the first heterophasic propylene copolymer (a).

In the first heterophasic propylene copolymer (a), the amount of the moiety derived from ethylene is preferably in the range from 40 to 53 wt % based on the total amount of the first ethylene-α-olefin copolymer (a2).

The moiety of α-olefin in the first ethylene-α-olefin copolymer (a2) in the first heterophasic propylene copolymer (a) is preferably derived from at least one α-olefin having 3 to 20 carbon atoms, for example the first ethylene-α-olefin copolymer (a2) can be an ethylene-propylene copolymer, for example the first ethylene-α-olefin copolymer (a2) can be an ethylene-butene copolymer, for example the first ethylene-α-olefin copolymer (a2) can be an ethylene-hexene copolymer, for example the first ethylene-α-olefin copolymer (a2) can be an ethylene-octene copolymer, for example the first ethylene-α-olefin copolymer (a2) can be an ethylene-propylene-butene copolymer, for example the first ethylene-α-olefin copolymer (a2) can be an ethylene-propylene-hexene copolymer. Preferably the first ethylene-α-olefin copolymer (a2) in the first heterophasic propylene copolymer (a) is an ethylene-propylene copolymer The MFI of the first heterophasic propylene copolymer (a) is in the range from 40 to 120 dg/min, more preferably from 40 to 100 dg/min, most preferably from 60-100 dg/min, as determined according to ISO1133-1:2011 at 230° C. with a 2.16 kg load.

The first heterophasic propylene copolymer (a) can be divided into a first xylene-soluble part (First CXS) and a first xylene-insoluble part (First CXI). The amount of the xylene-soluble part of the first heterophasic propylene copolymer (a) is in the range from 10 to 27 wt %, preferably from 10 to 16 wt % based on the total amount of the first heterophasic propylene copolymer (a) as determined according to ISO16152:2005. The amount of the first xylene-insoluble part based on the total amount of the first heterophasic propylene copolymer is calculated by the following equation:

First CXI=100 wt %−First CXS

The ratio between the intrinsic viscosity of the xylene-soluble part of the first heterophasic propylene copolymer (a) $IV_{First\ CXS}$ and the intrinsic viscosity of the xylene-insoluble part of the first heterophasic propylene copolymer (a) $IV_{First\ CXI}$ is in the range from 3.1 to 7.2, preferably from 3.2 to 5.1, wherein $IV_{First\ CXS}$ and $IV_{First\ CXI}$ are measured according to ISO1628-1:2009 and ISO1628-3:2010 respectively.

The intrinsic viscosity of the first xylene-insoluble part (First CXI) of the first heterophasic propylene copolymer (a) $IV_{First\ CXI}$ is preferably in the range from 1.0 to 2.0 dl/g, more preferably in the range from 1.0 to 1.8 dl/g, more preferably from 1.1 to 1.5 dl/g, even more preferably in the range from 1.2 to 1.4 dl/g as measured according to ISO1628-3:2010.

The intrinsic viscosity of the first xylene-soluble part (First CXS) of the first heterophasic propylene copolymer (a) $IV_{First\ CXS}$ is preferably in the range from 4.5 to 6.5 dl/g, more preferably in the range from 4.8 to 6.5 dl/g, even more preferably in the range from 4.8 to 6.0 dl/g as measured according to ISO1628-1:2009.

The first heterophasic propylene copolymer (a) is preferably a non-visbroken heterophasic propylene copolymer. The term non-visbroken is known in the art, yet for the avoidance of doubt it means that the materials was not treated such as to modify the molecular weight and/or the molecular weight distribution of the polymer directly after polymerisation. In other words, non-visbroken polymers are not treated with peroxides, radiation, or any other initiating source for chain breaking reactions to occur. An advantage of non-visbroken polypropylenes over vis-broken polypropylenes is that the former generally suffer less from the release of low molecular weight materials, such materials inherently being produced upon visbreaking and is not desired for automotive application. For the avoidance of doubt, the term reactor grade indicates that the copolymer is non-visbroken. The first heterophasic propylene copolymer (a) is preferably a reactor grade heterophasic propylene copolymer.

The process to produce the first heterophasic propylene copolymer (a) is known in the art. Preferably the first heterophasic propylene copolymer (a) is produced in a sequential polymerization process comprising at least two reactors, more preferably the polypropylene of the present invention is produced in a sequential polymerization process comprising at least three reactors.

The catalyst used in the preparation of the first heterophasic propylene copolymer (a) is also know in the art, for example Ziegler-Natta catalyst, metallocene catalyst. Preferably the catalyst used to produce the first heterophasic propylene copolymer is free of phthalate, for example the catalyst comprises compounds of a transition metal of Group 4 to 6 of IUPAC, a Group 2 metal compound and an internal donor wherein said internal donor include but are not limited to 1,3-diethers, for example 9,9-bis (methoxymethyl) fluorene, optionally substituted malonates, maleates, succinates, glutarates, benzoic acid esters, cyclohexene-1,2-dicarboxylates, benzoates, citraconates, aminobenzoates, silyl esters and derivatives and/or mixtures thereof.

For example the catalyst used in the preparation of the first heterophasic propylene copolymer (a) is a Ziegler-Natta catalyst comprising a procatalyst, at least one external donor, a co-catalyst and an optional internal donor wherein the external electron donor is chosen from the group consisting of a compound having a structure according to Formula III $(R^{90})_2N$—$Si(OR^{91})_3$, a compound having a structure according to Formula IV: $(R^{92})Si(OR^{93})_3$ and mixtures thereof, wherein each of $R^{90}$, $R^{91}$, $R^{92}$ and $R^{93}$ groups are each independently a linear, branched or cyclic, substituted or unsubstituted alkyl having between 1 and 10 carbon atoms, preferably a linear unsubstituted alkyl having between 1 and 8 carbon atoms, preferably ethyl, methyl or n-propyl.

In one embodiment, $R^{90}$ and $R^{91}$ are each ethyl (compound of Formula III is diethylaminotriethoxysilane, DEATES). In another embodiment, $R^{92}$ is n-propyl and $R^{93}$ are each ethyl (compound of Formula IV is n-propyl triethoxysilane, nPTES) or in another embodiment $R^{92}$ is n-propyl and $R^{93}$ are each methyl (compound of Formula IV is n-propyl trimethoxysilane, nPTMS).

Preferably, the heterophasic propylene copolymer of the invention is prepared by a catalyst system comprising a Ziegler-Natta catalyst and at least one external electron donor chosen from the group of a compound having a structure according to Formula III $(R^{90})_2N$—$Si(OR^{91})_3$, a compound having a structure according to Formula IV: $(R^{92})Si(OR^{93})_3$ and mixtures thereof.

A "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst, such as triisobutylaluminum, trihexylaluminum, di-isobutylaluminum hydride, dihexylaluminum hydride, isobutylaluminum dihydride, hexylaluminum dihydride, diisobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. In an embodiment, the cocatalyst is selected from triethylaluminum, triisobutylaluminum, trihexylaluminum, di-isobutylaluminum hydride and dihexylaluminum hydride. More preferably, trimethylaluminium, triethylaluminium, tri-isobutylaluminium, and/or trioctylaluminium. Most preferably, triethylaluminium (abbreviated as TEAL). The co-catalyst can also be a hydrocarbyl aluminum compound such as tetraethyl-dialuminoxane, methylaluminoxane, isobutyl-aluminoxane, tetraisobutyl-dialuminoxane, diethyl-aluminumethoxide, diisobutylaluminum chloride, methylaluminum dichloride, diethylaluminum chloride, ethylaluminum dichloride and dimethylaluminum chloride, preferably TEAL.

For example, the procatalyst may be prepared by a process comprising the steps of providing a magnesium-based support, contacting said magnesium-based support with a Ziegler-Natta type catalytic species, an internal donor, and an activator, to yield the procatalyst. For example, the Examples of U.S. Pat. No. 5,093,415 of Dow discloses an improved process to prepare a procatalyst. Preferably, the procatalyst is a chemical compound comprising titanium.

In the context of the present invention, the molar ratio between Si and Ti element in the catalyst system is preferably in the range from 0.1 to 40, preferably from 0.1 to 20, even more preferably from 1 to 20 and most preferably from 2 to 10. Preferably the molar ratio between Al and Ti element in the catalyst system is in the range from 5 to 500, preferably from 15 to 200, more preferably from 30 to 160, most preferably from 50 to 140.

In one embodiment, the molar ratio between Si and Ti element is the molar ratio between the external donor and the procatalyst.

In one embodiment, the molar ratio between Al and Ti element is the molar ratio between the co-catalyst and the procatalyst.

The Second Heterophasic Propylene Copolymer (b)

The second heterophasic propylene copolymer (b) preferably comprises a second propylene polymer (b1) as matrix and a second ethylene-α-olefin copolymer (b2) as dispersed phase.

The amount of the second propylene polymer (b1) is preferably in the range from 65 to 81 wt %, preferably in the range from 70 to 76 wt % based on the total amount of the second heterophasic propylene copolymer (b).

The second propylene polymer (b1) in the second heterophasic propylene copolymer (b) can be a propylene homopolymer or/and a propylene-α-olefin copolymer wherein the α-olefin has 2 or 4 to 20 carbon atoms, for example the propylene-α-olefin can be a propylene-ethylene copolymer or a propylene-butene copolymer. Preferably the second propylene polymer (b1) in the second heterophasic propylene copolymer (b) is a propylene homopolymer.

The MFI of the second propylene polymer (b1) in the second heterophasic propylene copolymer (b) is preferably in the range from 20 to 150 dg/min, preferably from 50 to 100 dg/min, more preferably from 60 to 90 dg/min as measured according to ISO1133-1:2011 at 230° C. with a 2.16 kg load.

The amount of the second ethylene-α-olefin copolymer (b2) is preferably in the range from 19 to 35 wt %, preferably from 24 to 30 wt % based on the total amount of the second heterophasic propylene copolymer (b).

In the second heterophasic propylene copolymer (b), the amount of the moiety derived from ethylene is preferably in the range from 55 to 68 wt % based on the total amount of the second ethylene-α-olefin copolymer (b2).

The moiety of α-olefin in the second ethylene-α-olefin copolymer (b2) in the second heterophasic propylene copolymer (b) is preferably derived from at least one α-olefin having 3 to 20 carbon atoms, for example the second ethylene-α-olefin copolymer (b2) can be an ethylene-propylene copolymer, for example the second ethylene-α-olefin copolymer (b2) can be an ethylene-butene copolymer, for example the second ethylene-α-olefin copolymer (b2) can be an ethylene-hexene copolymer, for example the second ethylene-α-olefin copolymer (b2) can be an ethylene-octene copolymer, for example the second ethylene-α-olefin copolymer (b2) can be an ethylene-propylene-butene copolymer, for example the second ethylene-α-olefin copolymer (b2) can be an ethylene-propylene-hexene copolymer. Preferably the second ethylene-α-olefin copolymer (b2) in the second heterophasic propylene copolymer (b) is an ethylene-propylene copolymer.

The MFI of the second heterophasic propylene copolymer (b) is in the range from 5.6 to 65 dg/min, more preferably in the range from 7.1 to 53 dg/min, more preferably in the range from 10.3 to 39 dg/min, more preferably in the range from 12.5 to 27 dg/min, as determined according to ISO1133-1:2011 at 230° C. with a 2.16 kg load.

The second heterophasic propylene copolymer (b) can be divided into a second xylene-soluble part (Second CXS) and a second xylene-insoluble part (Second CXI). The amount of the second xylene-soluble part of the second heterophasic propylene copolymer (b) is in the range from 12 to 27 wt %, preferably in the range from 16 to 25 wt %, more preferably in the range from 18 to 23 wt % based on the total amount of the second heterophasic propylene copolymer (a) as determined according to ISO16152:2005.

The intrinsic viscosity of the second xylene-soluble part (Second CXS) of the second heterophasic propylene copolymer (b) $IV_{Second\ CXS}$ is in the range from 2.9 to 4.6 dl/g, more preferably from 3.5 to 4.4 dl/g, even more preferably from 3.8 to 4.2 dl/g as measured according to ISO1628-1: 2009.

The second heterophasic propylene copolymer (b) is preferably a reactor grade heterophasic propylene copolymer.

The second heterophasic propylene copolymer (b) can be produced with process and catalyst known in the art.

In one embodiment, the second heterophasic propylene copolymer (b) is produced with the same process as the first heterophasic propylene copolymer (a).

In one embodiment, the second heterophasic propylene copolymer (b) is produced with the same catalyst as the first heterophasic propylene copolymer (a).

Optional Inorganic Filler

The polymer composition according to the present invention may further comprise an inorganic filler.

Suitable examples of inorganic fillers include but are not limited to talc, calcium carbonate, wollastonite, barium sulfate, kaolin, glass flakes, laminar silicates (bentonite, montmorillonite, smectite) and mica.

For example, the inorganic filler is chosen from the group of talc, calcium carbonate, wollastonite, mica and mixtures thereof.

More preferably, the inorganic filler is talc. The mean particle size of talc (D50) of talc is preferably in the range from 0.1 to 10.2 micron, preferably from 0.3 to 8.1 micron, more preferably from 0.5 to 5.2 micron, even more preferably from 0.6 to 2.5 micron according to sedimentation analysis, Stockes' law (ISO 13317-3:2001).

Optional Polyolefin Based Elastomer

Optionally the polymer composition according to the present invention comprises a polyolefin based elastomer. The polyolefin based elastomer is preferably an ethylene-α-olefin copolymer wherein the α-olefin has 3 to 20 carbon atoms, for example the ethylene-α-olefin copolymer is an ethylene-propylene copolymer, for example the ethylene-α-olefin copolymer is an ethylene-butene copolymer, for example the ethylene-α-olefin copolymer is an ethylene-hexene copolymer, for example the ethylene-α-olefin copolymer is an ethylene-octene copolymer or a combination thereof.

Preferably the polyolefin based elastomer is an ethylene-butene copolymer or/and an ethylene-octene copolymer.

Preferably the amount of moiety derived from ethylene in the polyolefin based elastomer is in the range from 45 to 90 wt %, preferably from 50 to 87 wt %, more preferably from 55 to 85 wt %, more preferably from 57 to 70 wt % based on the total amount of the polyolefin based elastomer.

The polyolefin based elastomer according to the present invention preferably has a shore A hardness in the range from 40 to 85, more preferably in the range from 51 to 79, more preferably in the range from 54 to 68 as measured according to ASTM D2240-15.

The density of the polyolefin based elastomer according to the present invention is preferably in the range from 0.853 to 0.905 g/cm3, preferably from 0.859 to 0.896 g/cm3, more preferably from 0.860 to 0.882 g/cm3, more preferably from 0.860 to 0.876 g/cm3 as measured according to ASTM D792-13.

The MFI of the polyolefin based elastomer is preferably in the range from 0.20 to 20.0 dg/min, preferably from 0.30 to 14.3 dg/min, more preferably from 0.40 to 7.2 dg/min as measured according to ASTM D1238-13 with a 2.16 kg load at 190° C.

The polyolefin based elastomer may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The polyolefin based elastomer may also be prepared using traditional types of heterogeneous multi-sited Ziegler-Natta catalysts.

In one embodiment, the polyolefin based elastomer is a high density polyethylene, wherein the MFI of the high density polyethylene is in the range from 2.3 to 19.8 dg/min, preferably from 4.9 to 15.4 dg/min, more preferably from 6.1 to 11.5 dg/min as measured according to ASTM D1238-13 with a 2.16 kg load at 190° C., wherein the density of the high density polyethylene is in the range from 0.920 to 0.972 g/cm$^3$, preferably from 0.953 to 0.970 g/cm$^3$, more preferably from 0.960 to 0.968 g/cm$^3$ as measured according to ASTM D792-13.

Optional Additives

The polymer composition according to the present invention may further contain additives, for instance nucleating agents and clarifiers, stabilizers, release agents, plasticizers, anti-oxidants, lubricants, anti-statics, cross linking agents, scratch resistance agents, high performance fillers, pigments and/or colorants, flame retardants, blowing agents, acid scavengers, recycling additives, anti-microbials, anti-fogging additives, slip additives, anti-blocking additives, polymer processing aids and the like. Such additives are well known in the art. The amount of the additives is preferably to be at most 5.0 wt %, preferably at most 4.5 wt %, preferably at most 4 wt %, more preferably at most 3.8 wt % based on the total amount of the polymer composition. The reason for the preference of the low amount of additives is that at this amount, additives do not have negative influence on the desired properties of the polymer composition according to the present invention.

Polymer Composition

The polymer composition according to the present invention comprises said first heterophasic propylene copolymer (a), said second heterophasic propylene copolymer (b), optional inorganic filler, optional polyolefin based elastomer and optional additives wherein the amount of the first heterophasic propylene copolymer (a) is in the range from 5.3 to 63.7 wt %, preferably in the range from 10.3 to 42.7 wt % based on the total amount of the polymer composition, wherein the amount of the second heterophasic propylene copolymer (b) is in the range from 4.7 to 64.5 wt %, preferably from 8.2 to 40.1 wt % based on the total amount of the polymer composition.

The total amount of the first heterophasic propylene copolymer (a), the second heterophasic propylene copolymer (b), the optional polyolefin based elastomer, the optional inorganic filler and the optional additives is preferably at least 95 wt %, preferably at least 97 wt %, preferably at least 98.5 wt % and preferably at most 100 wt % based on the total amount of the polymer composition.

The amount of the inorganic filler is preferably in the range from 2.5 to 31.0 wt %, preferably in the range from 3.4 to 25.6 wt %, more preferably from 4.6 to 20.7 wt %, more preferably in the range from 5.7 to 17.3 wt %, most preferably in the range from 6.5 to 15.2 wt % based on the total amount of the polymer composition.

The MFI of the polymer composition is in the range from 5 to 100 dg/min, preferably in the range from 10 to 70 dg/min, more preferably in the range from 15 to 50 dg/min, more preferably in the range from 15 to 26 dg/min as measure according to ISO1133-1:2011 with a 2.16 kg load at 230° C. as in the preferred MFI range, the polymer composition has an optimal balance between impact performance and processability.

The polymer composition according to the present invention can for example be prepared in an extrusion process by melt-mixing the first heterophasic propylene copolymer, the high density polyethylene, the second heterophasic propylene copolymer, the optional polyolefin elastomer, the optional inorganic filler and the optional additives in an extruder.

The present invention further relates to a process for the preparation of an article, preferably an automotive part, comprising the sequential steps of:

Providing the polymer composition according to the present invention;

Injection molding the polymer composition according to the present invention in to the article.

The present invention further relates to the use of the polymer composition according to the present invention for automotive applications.

The present invention further relates to an article comprising the polymer composition according to the present invention, preferably the article is an automotive part, wherein the amount of the polymer composition according to the present invention is at least 95 wt %, preferably at least 98 wt % based on the total amount of the article.

For the avoidance of any confusion, in the context of the present invention, the term "amount" can be understood as "weight"; "Melt flow index (MFI)" refers to the same physical property as "melt flow rate (MFR)".

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process. When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Materials

PP 22 is a heterophasic propylene copolymer grade commercially available from SABIC, the properties of PP 22 are given in Table 3.

To produce PP 100, a base heterophasic propylene copolymer powder was produced according to WO2018/108927 P18 L15-P19 L11. Then the base heterophasic propylene copolymer powder was shifted to MFI 100 dg/min (ISO1133-1:2011, 230° C., 2.16 kg) in a peroxide shifting process to obtain PP 100. The properties of PP 100 are given in Table 3.

Polymer A, B, C and D are heterophasic propylene copolymers prepared in an Innovene™ process, wherein a sequential two-reactor setup was employed. Polypropylene homopolymers were produced in first reactor and propylene-ethylene copolymers were produced in the second reactor.

There were three component in the catalyst system in the polymerization process: A procatalyst, an external electron donor and a co-catalyst. The procatalyst was prepared according to the description in WO2016198344, page 36, "Procatalyst III" paragraph; The external electron donor used for Polymer A and B was di(iso-propyl) dimethoxysilane (DiPDMS), the external electron donor used for Polymer C and D was n-propyltriethoxysilane (nPTES); the co-catalyst was triethylaluminium.

The process condition of Polymer A, B, C and D are given in Table 1:

TABLE 1

| Preparation condition of Polymer A, B, C and D | | | | |
|---|---|---|---|---|
| Polymer | A | B | C | D |
| R1 Te (° C.) | 66 | 66 | 69.5 | 69.5 |
| R1 Pr (Bar) | 24 | 24 | 24 | 24 |
| Al/Ti (mol/mol) | 135 | 135 | 135 | 135 |
| Si/Ti (mol/mol) | 10 | 10 | 10 | 10 |
| R1 H2/C3 (mol/mol) | 0.08 | 0.05 | 0.01 | 0.065 |
| R1 split (wt %) | 80 | 74 | 76 | 86 |
| R2 Te (° C.) | 66 | 57 | 66 | 59 |
| R2 Pr (Bar) | 24 | 24 | 24 | 24 |
| R2 H2/C3 (mol/mol) | 0.132 | 0.005 | 0.011 | 0.0042 |
| R2 C2/C3 (mol/mol) | 0.63 | 0.33 | 0.3 | 0.31 |
| R2 split (wt %) | 20 | 26 | 24 | 14 |

In Table 1, R1 refers to the first reactor, R2 refers to the second reactor, Te refers to temperature, Pr refers to pressure, Al/Ti is the molar ratio of the co-catalyst to the procatalyst, Si/Ti is the molar ratio of the external donor to the procatalyst, H2/C3 is the molar ratio of hydrogen to propylene, C2/C3 is the molar ratio of ethylene to propylene, split is the amount of substance produced in R1 or R2 based on the amount of the total Polymer A or B or C or D respectively.

HDPE 80064 is a high density polyethylene commercially available from SABIC with grade name HDPE M800645 having a density of 0.964 g/cm3 (ASTM D792-13) and an MFI of 8.0 g/10 min (ASTM D1238-13, 2.16 kg, 190° C.).

Tafmer DF605 is an ethylene-1-butene elastomer, commercially available from Mitsui Chemicals, having a density of 0.861 g/cm3 (ASTM D792-13), an MFI of 0.5 g/10 min (ASTM D1238-13, 2.16 kg, 190° C.) and a shore A hardness of 58 (ASTM D2240-15).

Engage 8200 is an ethylene-1-octene elastomer commercially available from Dow, having a density of 0.870 g/cm3 (ASTM D792-13), an MFI of 5.0 g/10 min (ASTM D1238-13, 2.16 kg, 190° C.) and a shore A hardness of 66 (ASTM D2240-15).

Luzenac HAR T84 is a high aspect ratio talc commercially available from Imerys Talc. The mean particle size of talc (D50) of Luzenac HAR T84 is 2 micron as measured according to sedimentation analysis, Stockes' law (ISO 13317-3:2001).

Steamic OOS D is a fine talc commercially available from Imerys Talc. The median diameter D50 of Steamic OOS D is 2.0 µm as measured according to ISO 13317-3:2001 (Sedimentation analysis, Stokes' Law).

The additive package used consists of 50 wt % color masterbatch, 20 wt % heat and process stabilizers, 10 wt % UV stabilizer, 20 wt % processing aid based on the total amount of the additive package.

Sample Preparation

Compounding

Pellets of the Examples were prepared by compounding the components in amounts as indicated in Table 3 in a KraussMaffei Berstorff ZE40A_UTX 43D twin-screw extruder with the following setting: 400 rpm screw speed, 150 kg/h through put, 38% torque, 235° C. as temperature and 13 bar as head pressure.

Specimens Preparation

Specimens for the measurement were prepared by injection molding the pellets of Examples. The dimensions of the specimens used in tensile test are defined in ISO 527-2 type 1(a); The dimensions of the specimens used in impact resistance test are defined in ISO180/1A; The dimensions of the specimens used in HDT measurement are 80*10*4 mm.

Test Method

Melt Flow Index

Melt flow index (MFI) was measured according to ISO1133-1:2011 at 230° C. with a 2.16 kg load.

Weight percentage of the xylene-soluble part (CXS) and weight percentage of the xylene-insoluble part (CXI)

Weight percentage of the xylene-soluble part (CXS) of the heterophasic propylene copolymers was determined according to ISO16152:2005. Weight percentage of xylene-insoluble part (CXI) of the heterophasic propylene copolymers was calculated using the following equation:

$$CXI = 100 \text{ wt \%} - CXS$$

Both xylene-soluble and xylene-insoluble parts (CXS and CXI) obtained in this test were used in the intrinsic viscosity (IV) test.

Intrinsic Viscosity (IV)

Intrinsic viscosity (IV) of CXS and CXI was determined according to ISO1628-1:2009 and ISO1628-3:2010 respectively in decalin at 135° C.

Impact Resistance

Impact resistance is determined according to Izod ISO180:2000 at 23° C.

Tensile Modulus

Tensile modulus was determined according to ISO527-1: 2012 at 23° C.

Heat Deflection Temperature (HDT)

HDT was measured according to ISO 75-2:2013 Flatwise (L=0,45)

Tiger Stripe (TS) Evaluation

Figure 2:
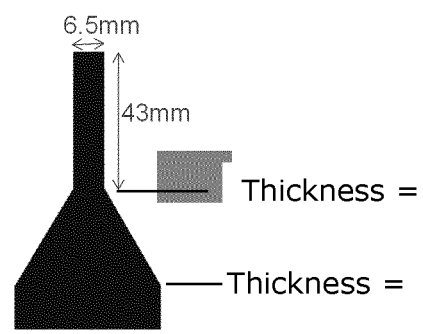
FIG. 2 illustrates one type of a gate system called a fan gate.
Figure 3:
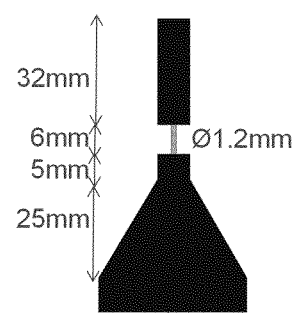
FIG. 3 illustrates another type of a gate system called a pin-point gate.

The pellets of Examples were injection moulded into two types of ruler-shaped test specimens using the feeding system and the mold as illustrated in FIG. 1. The details of the two types of the molds are illustrated in FIGS. 2 and 3. The two types of the molds are called a fan gate (FIG. 2) and a pin-point gate (FIG. 3).

FIG. 1 illustrates the feeding system and the mold. The molten sample was injected through a sprue having an upper end having a diameter of 4 mm and a lower end having a diameter of 7 mm. The lower end of the sprue merges with a rectangular channel of the mold, the rectangular channel having a width of 6.5 mm and a depth of 3 mm.

FIG. 2 illustrates one type of a gate system called a fan gate. After the rectangular channel having a length of 43 mm, a fan shaped part follows having a length of 25 mm. Along the length of the fan shaped part, the width changes from 6.5 mm to 30 mm and the thickness changes from 3 mm to 2 mm. After the fan shaped part, an elongated part follows having a width of 30 mm and a thickness of 3 mm.

FIG. 3 illustrates another type of a gate system called a pin-point gate. The pin-point gate is identical to the fan gate of FIG. 2 except that the rectangular channel has three regions: a first region having a length of 32 mm and a width of 6.5 mm, followed by a second region having a length of 6 mm and a width of 1.2 mm, followed by a third region having a length of 5 mm and a width of 6 mm.

The melt temperature during the injection was set to 240° C. and the mold set to room temperature. Three different screw speeds were used according to Table 2. Specimens having a smooth side and a textured side were obtained.

TABLE 2

| | Injection conditions | | |
|---|---|---|---|
| Condition | Screw speed injection [mm/sec] | Flow rate [cm³/sec] | Injection time [sec] |
| Low speed | 20 | 14.1 | 2.49-2.51 |
| Medium speed | 50 | 35.3 | 0.99-1.0 |
| High speed | 160 | 113.1 | 0.38-0.39 |

Each of the specimens was visually observed for occurrence of tiger stripes on its smooth side and textured side. The quality of the surface was evaluated on a scale of 1 to 10, 10 being the best.

| TS score | description |
|---|---|
| 1 | *very sharp transitions between glossy and dull sections visible seen from any angle |
| 2 | *sharp transitions between glossy and dull sections seen from any angle |
| 3 | very visible transitions between glossy and dull sections seen from any angle |
| 4 | visible transitions between glossy and dull sections seen from any angle |
| 5 | less visible transitions between glossy and dull sections seen from any angle |
| 6 | visible transitions between glossy and dull sections seen from a specific angle only |
| 7 | less visible transitions between glossy and dull sections seen from a specific angle only |
| 8 | no transitions between glossy and dull sections visible and surface appearance inhomogeneous |
| 9 | no transitions between glossy and dull sections visible and surface appearance homogeneous |
| 10 | no transitions between glossy and dull sections visible and surface is perfect |

Result

TABLE 3

Properties of HECOs

|  | PP22 | PP100 | Polymer A | Polymer B | Polymer C | Polymer D |
|---|---|---|---|---|---|---|
| MFI (g/10 min) | 22 | 100 | 40 | 14 | 12 | 77 |
| Weight fraction matrix (wt %) | — | — | 80 | 74 | 76 | 86 |
| CSX (wt %) | 30 | 16 | 18 | 22 | 22 | 14 |
| $IV_{CXS}$ (dl/g) | 1.7 | 2.3 | 2.2 | 4 | 1.9 | 5.3 |
| $IV_{CXI}$ (dl/g) | 1.4 | 1.2 | 1.3 | 1.4 | 1.3 | 1.3 |
| $IV_{CXS}/IV_{CXI}$ | 1.2 | 1.9 | 1.7 | 2.9 | 1.5 | 4.1 |

TABLE 4

Properties of PPc

|  | CE1 | CE2 | IE1 | IE2 | IE3 |
|---|---|---|---|---|---|
| Polymer A (wt %) | 52.5 | | | | |
| Polymer B (wt %) | 10 | | 35 | 10 | 35 |
| Polymer C (wt %) | | | | 30 | |
| Polymer D (wt %) | | 30.2 | 35.8 | 27.2 | 12.5 |
| PP 100 (wt %) | | | | | 25 |
| PP 22 (wt %) | 20 | 40 | | | |
| HDPE M80064 (wt %) | | | 8 | | |
| Tafmer DF605 (wt %) | | 12 | | 15 | |
| Engage 8200 (wt %) | 5 | | 8 | | 14 |
| Luzenac Har T84 (wt %) | 10 | | | | 12 |
| Steamic OOS D (wt %) | | 14 | 10 | 14 | |
| Additive package (wt %) | 2.5 | 3.8 | 3.2 | 3.8 | 1.5 |
| MFI (dg/min) | 22.2 | 16.4 | 17.9 | 20.4 | 24.9 |
| Impact resistance (kJ/m2) | 18.8 | 46 | 11.6 | 22 | 49.7 |
| Tensile modulus (MPa) | 1482 | 1036 | 1436 | 1280 | 1490 |
| HDT (° C.) | 88 | 90 | 98 | 98 | 99 |
| Tiger stripe rating | 5 | 7.6 | 10 | 8.1 | 7.8 |

According to the information in Table 4, the polymer compositions of the invention as exemplified by IE 1-3 show high HDT and also good tiger stripe performance in comparison with the comparative examples.

The invention claimed is:

1. A polymer composition comprising a first heterophasic propylene copolymer (a), a second heterophasic propylene copolymer (b) and optionally an inorganic filler, wherein the amount of the first heterophasic propylene copolymer (a) is in the range from 5.3 to 63.7 wt % based on the total amount of the polymer composition, wherein the amount of the second heterophasic propylene copolymer (b) is in the range from 4.7 to 64.5 wt % based on the total amount of the polymer composition,
wherein the xylene soluble part of first heterophasic propylene copolymer (a) is in the range from 10 to 27 wt % as determined by ISO16152: 2005 based on the total amount of the first heterophasic propylene copolymer (a), wherein the ratio between the intrinsic viscosity of the xylene soluble part of first heterophasic propylene copolymer (a) and of the xylene insoluble part of first heterophasic propylene copolymer (a) is in the range from 3.1 to 7.2, wherein the intrinsic viscosity of the xylene soluble part and of the xylene-insoluble part are measured according to ISO1628-1:2009 and ISO1628-3:2010 respectively in decalin at 135° C.; wherein the MFI of the first heterophasic propylene copolymer (a) is in the range from 40 to 120 dg/min as determined according to ISO1133-1:2011 at 230° C. with a 2.16 kg load;
wherein the xylene soluble part of the second heterophasic propylene copolymer (b) is in the range from 12 to 27 wt % as determined by ISO16152: 2005 based on the total amount of the second heterophasic propylene copolymer (b), where in the intrinsic viscosity of the xylene soluble part of the second heterophasic propylene copolymer (b) is in the range from 2.9 to 4.6 dl/g as measure according to ISO1628-1:2009 in decalin at 135° C.; wherein the MFI of the second heterophasic propylene copolymer (b) is in the range from 5.6 to 65 dg/min as determined according to ISO1133-1:2011 at 230° C. with 2.16 kg load,
wherein the MFI of the polymer composition is in the range from 5 to 100 dg/min as determined according to ISO1133-1:2011 at 230° C. with 2.16 kg load.

2. The polymer composition according to claim 1, wherein the amount of the first heterophasic propylene copolymer (a) is in the range from 10.1 to 50.8 wt % based on the total amount of the polymer composition.

3. The polymer composition according to claim 1, wherein the intrinsic viscosity of the xylene-insoluble part (CXS) of the first heterophasic propylene copolymer (a) $IV_{CXS}$ is in the range from 4.5 to 6.5 dl/g, as measured according to ISO1628-1:2009 in decalin at 135° C.

4. The polymer composition according to claim 1, wherein the intrinsic viscosity of the xylene-soluble part (CXI) of the first heterophasic propylene copolymer (a) $IV_{CXI}$ is in the range from 1.0 to 2.0 dl/g, as measured according to ISO1628-3:2010 in decalin at 135° C.

5. The polymer composition according to claim 1, wherein the amount of the second heterophasic propylene copolymer (b) is in the range from 6.5 to 50.1 wt %, based on the total amount of the polymer composition.

6. The polymer composition according to claim 1, wherein the MFI of the second heterophasic propylene copolymer (b) is in the range from 7.1 to 53 dg/min, as determined according to ISO1133-1:2011 at 230° C. with 2.16 kg load.

7. The polymer composition according to claim 1, wherein the inorganic filler is talc, and/or wherein the amount of the inorganic filler is in the range from 2.5 to 31.0 wt % based on the total amount of the polymer composition.

8. The polymer composition according to claim 1, wherein the propylene the first heterophasic propylene copolymer (a) comprises a propylene homopolymer and/or the second heterophasic propylene copolymer (a) comprises a propylene homopolymer.

9. The polymer composition according to claim 1, wherein the first heterophasic propylene copolymer (a) comprises an ethylene-propylene copolymer.

10. The polymer composition according to claim 1, wherein the polymer composition further comprises at least one polyolefin based elastomer, wherein the MFI of the polyolefin based elastomer is in the range from 0.20 to 12 g/10 min as measured according to ASTM D1238-13 at 190° C. with a 2.16 kg load.

11. The polymer composition according to claim 10, wherein the polyolefin based elastomer is selected from the group consisting of ethylene-1-butene copolymer, ethylene-1-hexene copolymer, ethylene-1-octene copolymer and mixtures thereof, and/or wherein the Shore A hardness of the polyolefin based elastomer is in the range from 40 to 85 as measured according to ASTM D2240-15.

12. The polymer composition according to claim 1, wherein the amount of the first heterophasic propylene copolymer (a) is in the range from 12.2 to 42.7 wt % based on the total amount of the polymer composition.

13. The polymer composition according to claim 1, wherein the amount of the second heterophasic propylene copolymer (b) is in the range from 8.2 to 40.1 wt % based on the total amount of the polymer composition.

14. A process for the preparation of an article comprising the sequential steps of:
  providing the polymer composition of claim 1; and
  injection molding the polymer composition into the article.

15. An article comprising the polymer composition of claim 1.

* * * * *